United States Patent [19]

Sadowski

[11] Patent Number: 4,483,962

[45] Date of Patent: Nov. 20, 1984

[54] AQUEOUS ADHESIVE SYSTEMS

[75] Inventor: John S. Sadowski, Kutztown, Pa.

[73] Assignee: Lord Corporation, Erie, Pa.

[21] Appl. No.: 515,991

[22] Filed: Jul. 22, 1983

[51] Int. Cl.$^3$ ............................................ C08F 236/16
[52] U.S. Cl. .................... 524/552; 524/818; 524/827; 524/832; 526/292.7; 526/292.8; 526/293; 526/294
[58] Field of Search ............... 524/259, 807, 818, 827, 524/832, 552

[56] References Cited

FOREIGN PATENT DOCUMENTS 2078770  1/1982  United Kingdom ................ 524/259

Primary Examiner—Paul R. Michl
Attorney, Agent, or Firm—John A. Gazewood

[57] ABSTRACT

Terpolymer latexes prepared by emulsion polymerization of 2,3-dichloro-1,3-butadiene and a mixture of at least two different unsaturated monomers, said unsaturated monomers being at least individually copolymerizable with 2,3-dichloro-1,3-butadiene, provide adhesive systems which afford adhesive strengths comparable to commercial solvent-based adhesives in bonding natural and synthetic elastomers to rigid and non-rigid substrates. The latexes preferably contain at least one aromatic nitroso compound.

17 Claims, No Drawings

AQUEOUS ADHESIVE SYSTEMS

FIELD OF THE INVENTION

This invention relates to water-based organic compositions. More particularly, the invention relates to water-based organic polymer-containing compositions especially suitable for use as adhesives for bonding natural and synthetic elastomers to rigid and non-rigid substrates.

Historically, the major commercial adhesives which have been utilized to bond natural and synthetic elastomers to the same or different elastomers, as well as to non-rigid and other rigid substrates, including metals, wood, ceramics, natural and synthetic organic and inorganic fibers, and the like, have been solvent-based, that is, the adhesive ingredients including active components such as film-forming materials and adhesion-improving additives and also non-active components such as fillers and extenders, are dissolved or dispersed in volatile, inert organic solvents such as toluene, xylene and trichloroethane. Increasing concern over deleterious effects of solvent emissions to the atmosphere on the environment and to human safety has led to a concerted effort by industry to develop replacement adhesive systems. Alternatives to the current solvent-borne rubber-metal adhesives which have been proposed include the use of certain exempt solvents as defined by various governmental regulations, high solids adhesives at greater than 70% solids to minimize the amount of inert solvent used, 100% solids compositions which contain substantially no inert solvents, film adhesives and water-borne adhesives. The water-borne adhesives, that is, the adhesive ingredients are soluble in or dispersed into water, are especially attractive since they appear less susceptible to conflict with environmental regulations than adhesives containing any amount of solvent and they appear suited for use with the application equipment currently being used with the existing solvent-borne systems.

A particular problem in the development of water-borne adhesive systems was finding a suitable film-forming polymer or other material which in aqueous media would serve as a counterpart to the film-forming materials currently being used in solvent-borne adhesives. Generally, the basic formulating materials used to prepare solvent-borne adhesives are not soluble in water. Efforts to prepare satisfactory emulsions from these materials generally failed. A particularly promising approach has been the development of emulsion-polymerized copolymers of halogenated conjugated dienes and halogenated vinyl monomers, of which the copolymer of 2,3-dichloro-1,3-butadiene and α-chloroacrylonitrile is representative. From these emulsion copolymers, aqueous adhesive systems have been prepared which provide primary rubber-to-metal adhesion values substantially equivalent to those obtained with state-of-the-art solvent-borne adhesives. However, these newly-developed aqueous adhesives exhibit less-than-desirable attributes with respect to environmental resistance and pre-heat tolerance, that is, the capability of the adhesive to retain its adhesiveness while the adhesively-coated substrate is at bonding temperatures during processing before being contacted with the elastomer compositions.

It has now been discovered that certain terpolymers made from 2,3-dihalo-1,3-butadiene conjugated diene monomer and a mixture of at least two different unsaturated monomers, each of which is at least copolymerizable with the conjugated diene monomer, can be formulated into water-based adhesive systems which are especially suitable for bonding natural and synthetic rubbers to rigid and non-rigid substrates. The adhesive systems which are prepared in accordance with this invention provide improved metal adhesion, freeze-thaw stability, and offer enhanced pre-bake tolerance, that is, precure heat tolerance, and environmental resistance in comparison to the aqueous latexes prepared by emulsion copolymerization of halogenated conjugated dienes and halogenated vinyl monomers.

More particularly, the adhesive compositions of the present invention comprise a latex of at least one terpolymer prepared by the emulsion copolymerization in an aqueous medium in the presence of at least one anionic surfactant or a mixture of at least one anionic surfactant and at least one nonionic surfactant of a mixture consisting essentially of (1) at least one 2,3-dihalo-1,3-dihalo-1,3-butadiene conjugated diene monomer; and, (2), a mixture of at least two different unsaturated monomers, each of which is at least copolymerizable with the conjugated diene monomer. The adhesive latexes of the invention can have dispersed therein in the organic or oil phase from 1 to 200, preferably 10 to 150, parts by weight, per 100 parts by weight of terpolymer solids, of at least one aromatic nitroso compound. The adhesive compositions of the invention can have optionally included therein from 20 to 90 percent by weight of at least one water soluble or water-disposable auxiliary film-forming material selected from the group consisting of halogenated rubber, halogenated resins and phenolic resins, said percentage being based on total weight of said terpolymer solids and said auxiliary film-forming material.

With respect to the 2,3-dihalo-1,3-butadiene conjugated diene monomers, which are known articles of commerce, the halogen substituent is selected from the group consisting of chlorine, bromine and iodine, with chlorine being the current halogen substituent of choice.

With respect to the mixture of at least two different unsaturated monomers which are at least copolymerizable with the conjugated diene monomer, such monomers are selected from a first group consisting of, α-halo acrylonitrile, α-halo acrylic acid, α-halo acrylic ester, α-halo vinyl ketone, α-halo vinyl acetate, vinyl halide, vinylidene halide, styrene and monoalkenyl aromatic alkyl halide; and a second group consisting of monomeric compounds having at least one olefinically unsaturated group, said second group monomers being different from said first group monomers.

With respect to such first group of unsaturated monomers, the monoalkenyl aromatic alkyl halide monomers are currently preferred. Such unsaturated aromatic alkyl halides have the characteristic formulae

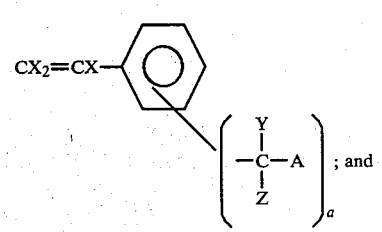

-continued

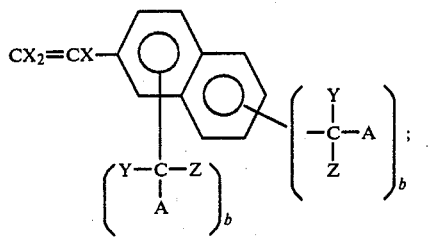
II.

wherein X is hydrogen, chlorine, bromine or iodine; Y is hydrogen, chlorine or bromine; Z is hydrogen, chlorine or bromine and A is hydrogen, chlorine, bromine or an alkyl group having from one to three carbon atoms, with the proviso that at least one of Y, Z or A is chlorine or bromine and, when A is alkyl, at least one of Y or Z is chlorine or bromine; a is one or two; and b is zero, one or two, with the proviso that at least one b be at least one. Currently, compounds having the formula I are preferred. Representative monoalkenyl aromatic alkyl halides include vinyl benzyl chloride, p-trichloromethyl-vinyl benzene, p-(α-chloroethyl) vinyl benzene, p-(α-chlorobutyl) vinyl benzene; α-chlorovinyl-benzene chloride; om-di(α-chloroethyl) vinyl benzene; 4-chloromethyl-vinyl naphthalene, their corresponding bromine and iodine analogs, and the like. The current monoalkenyl aromatic alkyl halide of choice is vinyl benzyl chloride(p-chloromethyl-vinyl-benzene).

With respect to said second group of copolymerizable monomeric compounds, the ethylenically unsaturated compounds of such second group are those that are polymerizable by unsaturation-addition, providing that they are non-crosslinking, that is, that there is either only one unsaturated ethylenic group in the compound or, if more than one, that they are conjugated or cross-conjugated. More specifically, the ethylenically unsaturated monomers that may be utilized in the terpolymers of this invention are those containing either a single or a plurality of

groupings.

The ethylenically unsaturated compounds containing the

group or groups include compounds such as styrene, p-chlorostyrene, 3,5-dichlorostyrene, p-methoxystyrene, acrylonitrile, metacrylonitrile, vinyl bromide, vinyl fluoride, vinyl iodide, vinyl acetate, vinyl propionate, vinyl butyrate, vinyl benzoate, vinylidene bromide, vinylidene chlorofluoride, methyl methacrylate, butyl methacrylate, methacrylamide, vinyl methylketone, vinyl pyrridine, vinyl carbazole, vinyl methylether, isobutylene, ethylene, vinyl chloride, vinylidene chloride, the alkyl acrylates including methyl, ethyl, propyl, butyl, and octyl acrylates, acrylic acid, and methacrylic acid, as well as other similar monolefinic polymerizable compounds. Other unsaturated compounds containing more than one olefinic group which may be copolymerized to form the terpolymers of this invention include the conjugated dienes such as butadiene-1,3, isoprene, and the other butadiene-1,3 hydrocarbons, chloroprene, and 3-cyanobutyldiene-1,3, as well as trienes such as myricene and compounds containing olefinic and acetylitic bonds such as vinyl acetylene, vinyl ethynyl, diethyl carbonyl and the like.

The terpolymer latexes which are employed in the present invention are prepared by emulsion polymerization of the halogenated conjugated diene and at least two different unsaturated comonomers in an aqueous medium in the presence of ionic or mixed ionic-nonionic surfactant system, with ionic surfactant systems being currently preferred. It has been found that the terpolymer products best suited for use in the practice of this invention contain from 60 to 97, preferably 75 to 97, and, optimally, 93 to 97, percent by weight of halogenated conjugated diene; from 2 to 33, preferably 3 to 25, and, optimally, 3 to 7, percent by weight of said first group monomer; and from 0.5 to 10, preferably 2 to 7, percent by weight of said second group monomer. Of especial value are the terpolymer products prepared from 2,3-dihalo-1,3-butadiene, especially 2,3-dichloro-1,3-butadiene; monoalkenyl aromatic alkyl halides, especially vinyl benzyl chloride; and olefinically unsaturated monomers, especially such monomers containing at least one —COOH group, with acrylic acid, methacrylic acid and 2-hydroxyethyl methacrylate monophosphate being particularly preferred.

The emulsion polymerization is carried out in a closed vessel in which the space not occupied by the reaction mixture is preferably maintained free of oxygen by a blanket of inert gas, such as nitrogen, since the induction period of the polymerization reaction is extended by the presence of oxygen and it is desirable to effect the reaction in the substantial absence of oxygen. In the broad sense, the emulsion polymerization is effected by mixing the monomeric ingredients, emulsifying this mixture, and subjecting the emulsion to moderate polymerization conditions until substantially all of the monomer charge has been polymerized. However, for various practical reasons which need not be discussed here, it has been discovered that emulsion polymerization of the tertiary monomer system is more efficiently accomplished by a semi-continuous procedure comprising the addition at a constant rate of an emulsion of halogenated conjugated diene and said first and second groups of monomers to a polymerization zone containing an aqueous solution or dispersion of polymerization initiator. Polymerization conditions are otherwise essentially the same as for conventional batch polymerization processes and need not be discussed here. The polymerization reaction is exothermic and the reaction temperature should be maintained below about 75° C., preferably below about 60° C. Substantially any free radical-generating catalyst or initiator, including the well-known redox catalyst systems, such as ammonium persulfate/sodium metabisulfite, benzoyl peroxide, hydrogen peroxide, di-t-butyl peroxide, azo-bis-(isobutyl nitrile), alkaline metal persulfates and alkaline metal ammonium perborates can be employed for the copolymerization reaction to assure more rapid onset of the reaction and more reproducable results. Following the polymerization, unreacted volatiles can be removed by vacuum treatment at elevated temperatures or steam distillation, with the specific method being a matter of choice.

Of prime importance to obtaining latexes which provide acceptable adhesion is the choice of surfactant agents. It has been found that it is necessary to employ anionic surfactant agents or mixtures of anionic and nonionic surfactant agents, with such mixtures being currently preferred. While cationic surfactants are effective emulsifying agents as such, their use in the preparation of the elastomeric terpolymer latexes of this invention, either alone or in combination with either or both anionic and nonionic agents, is detrimental to adhesive performance. The surfactant systems will be used in a range from 0.01 to 15 weight percent, preferably 1 to 10 weight percent, based on weight of monomers charged. The use of anionic-nonionic mixed surfactant system is currently preferred, at a ratio of 1.2–2.1:1, preferably 1.3–2.0:1, anionic:nonionic agent. Representative anionic agents include carboxylates, such as fatty acid soaps from lauric, stearic, oleics and acyl derivatives of sarcosine, such as methyl glycine; sulfates, such as sodium laurel sulfate; sulfated natural oils and esters, such as Turkey Red Oil and alkyl aryl polyether sulfates; alkyl aryl polyether sulfonates; isopropyl naphthalene sulfonates; and sulfosuccinates and sulfosuccinates; phosphate esters, such as short chain fatty alcohol partial esters of complex phosphates; and orthophosphate esters of polyethoxylated fatty alcohols. Representative nonionic agents include ethoxylated (ethylene oxide derivatives), mono- and polyhydric alcohols; ethylene oxide/propylene oxide block copolymers; esters, such as glyceryl, monostearate; products of the dehydration of sorbitol, such as sorbitan monostearate and polyethylene oxide sorbitan monolaurate; and amines, such as lauric acid, isopropenyl halide. Currently preferred is a 1.8:1 mixture of sodium dodecyl-diphenyl ether disulfonate anionic surfactant and nonyl phenol polyethylene glycol nonionic surfactant. Anionic and anionic-nonionic surfactant systems which must be employed in the practice of this invention are described in more depth in "Emulsions: Theory and Practice", by Paul Becher, Chapter 6, Reinhold Publishing Corporation, New York, 1965; and in McCutcheon's "Detergents and Emulsifiers, 1972 Annual".

The terpolymer latexes resulting from the emulsion copolymerization of halogenated dienes and first and second group of unsaturated monomers in accordance with this invention invariably show a pH in the range of 2–3. While such acidic compositions do provide excellent adhesive performances, it is advisable to adjust the pH to a value in the range of about 4–11, preferably 6–10, with acid scavengers or buffers, such as zinc oxide, dibasic lead phosphate, sodium acetate-acetic acid mixtures and the like, with dibasic lead phosphate being the current acid scavenger of choice. Such stabilizers will, of course, be used in an amount sufficient to provide the desired pH level.

The aromatic nitroso compounds which are suitable for use in the practice of the present invention can be any aromatic hydrocarbon such as benzene, naphthalene, anthracene and biphenyl which contains at least two nitroso groups attached directly to non-adjacent ring carbon atoms. More particularly, such nitroso compounds are described as poly-C-nitroso aromatic compounds having from 1 to 3 aromatic nuclei, including fused aromatic nuclei, having from 2 to 6 nitroso groups attached directly to non-adjacent nuclear carbon atoms. The presently preferred poly-C-nitroso materials are the dinitroso aromatic compounds, especially the di-nitroso benzenes and di-nitroso naphthalenes, such as the meta- or para-dinitroso benzenes and the meta- or para-dinitroso naphthalenes. The nuclear hydrogen atoms of the aromatic nucleus can be replaced by alkyl, alkoxy, cycloalkyl, aryl, arylkyl, alkyryl, aryl amine, aryl nitroso, amino, halogen, and the like groups. The presence of such substituents on the aromatic nucleus has little effect on the activity of the poly-C-nitroso compounds in the present invention. As far as it is currently known, there is no limitation as to the character of the substituents, which can be organic or inorganic in nature. Thus, where reference is made to poly-C-nitroso "aromatic compound", "benzenes", or "naphthalenes", it will be understood to include both substituted and unsubstituted nitroso compounds, unless otherwise specified.

Particularly preferred poly-C-nitroso compounds have a formula

$(R^3)_p$—Ar—$(NO)_2$;

wherein
Ar is selected from the group consisting of phenylene and naphthalene;
$R^3$ is a monovalent organic radical selected from the group consisting of alkyl, cycloalkyl, aryl, aryl alkyl, alkyryl, aryl amine and alkoxy radicals having from 1 to 20 carbon atoms, amino, or halogen, and is preferably an alkyl group having from 1 to 8 carbon atoms; and
p is 0, 1, 2, 3, or 4, and is preferably 0.

A partial non-limiting listing of suitable poly-C-nitroso compounds which are suitable for use in the practice of the invention include m-dinitroso benzene, p-dinitroso benzene, m-dinitroso naphthalene, p-dinitroso naphthalene, 2,5-di-nitroso-p-cymene, 2-methyl-1,4-dinitroso benzene, 2-methyl-5-chloro-1,4-dinitroso benzene, 2-fluoro-1,4-dinitroso benzene, 2-methoxy-1,3-dinitroso benzene, 5-chloro-1,3-dinitroso benzene, 2-benzyl-1,4-dinitroso benzene, and 2-cyclohexyl-1,4-dinitroso benzene.

Substantially any of the polymeric materials which have been heretofore employed as film-formers or film-forming adjuncts in rubber-metal adhesive formulations are suitable for use in the invention as auxiliary film-forming materials, providing that such polymeric materials are emulsifiable or can be dispersed into water employing the same kinds of surfactant agents as are employed in making the terpolymer latexes or emulsions of the invention, that is, ionic, nonionic or mixtures of ionic and nonionic surfactant agents. Such film-forming materials include, without limitation, thermosetting condensation polymers, such as thermosetting phenolic resins, thermosetting epoxy resins, thermosetting polyester resins, thermosetting triazine resins, and the like; polymers and copolymers of polyethylenically unsaturated materials such as poly(vinyl butaryl); poly(vinyl formyl); poly(vinyl acetate); chlorinated poly(vinyl chloride); copolymers of vinyl acetate and vinyl chloride; fluorinated copolymers of vinyl acetate and vinyl chloride; polymers of acrylic acid; copolymers of acrylic acid and conjugated dienes, such as 1,3-butadiene; 2-chloro-1,3-butadiene; 2,3-dichloro-1,3-butadiene; and the like, and including after halogenated products thereof, polymers of methacrylic acid; copolymers of methacrylic acid and conjugated diene; copolymers of vinyl pyrridine and conjugated dienes, and including polyvalent reaction products thereof; cellulosic materials such as cellulose acetate butyrate; and the like. Particularly preferred film-forming materials are halogen-containing rubbers, including without limitation, chlorinated natural rubber; polychloroprene; chlorinated polychloroprene; chlorinated polybutadiene; chlorinated polyethylene; chlorinated ethylene/propylene copolymers; chlorinated ethylene/propylene/nonconjugated diene terpolymers; chlorinated copolymers of butadiene and styrene; chlorosulfonated polyethylene; brominated poly(2,3-dichloro-1,3-butadiene); copolymers of 2,3-dichloro-1,3-butadiene and said first group of monomers herein; mixtures of such halogen-containing rubbers with hydro-halogenated rubbers of hypo-halogenated rubber; mixtures of two or more such halogen-containing rubbers and the like. Other suitable polymeric film-forming adjuncts include natural rubber, butyl rubber; ethylene/propylene copolymer(epm) rubber; ethylene propylene diene terpolymer(epdm) rubber; polymers and copolymers of dienes having from 4 to 12 carbon atoms, such as polybutadiene, and including also copolymers of such dienes of one or more different monomers copolymerizable therewith, such as SBR and butadiene/acrylic rubber. As indicated, halogenated polymeric materials, and particularly chlorinated and brominated rubbers, are preferred auxiliary film-forming materials. The relative ratios of elastomeric terpolymer to auxiliary film-forming materials, when employed, is generally in the range from 10 to 90, percent by weight of elastomeric terpolymer with a corresponding 90 to 10, preferably 80 to 10, percent by weight of auxiliary film-forming material.

The adhesive compositions of the present invention may also utilize fillers, extenders and coloring agents such as carbon black, as well as various metallic oxides, and so forth. These fillers are inert from the standpoint of effecting the adhesive properties of the compositions.

Generally, the solids content of the adhesive compositions of this invention may range from as low as 5 percent to as high as about 60 percent solids.

A salient feature of the aqueous adhesive compositions of this invention is good shelf life, that is, can stability. Whereas conventional aqueous adhesives have relatively short (1 day-2 weeks) shelf life, the invention compositions have a shelf life in excess of two months. Another meritorious feature is that the invention compositions do not exhibit a decline in bonding ability when coated on a substrate and stored in air over a period of time. Neither does the bond between rubber and substrate (with adhesive at the interface) deteriorate upon prolonged exposure to air.

The method of bonding natural and synthetic rubber to rigid and non-rigid substrates using the curable adhesive compositions of this invention generally comprises the steps of (1), making or preparing the above-described aqueous adhesive composition; (2), coating the substrate with a thin layer of the compositions; (3), drying the adhesive coating such as by air drying or heating in an oven at slightly elevated temperatures; (4), contacting the adhesive-coated substrate with a vulcanizable rubber composition; and, (5), curing the adhesive concurrently with vulcanization of the rubber.

The adhesive compositions of the present invention are prepared by conventional dispersion techniques utilized in forming oil-in-water emulsions, which do not require further elucidation herein.

The following examples are provided to illustrate the invention. All parts and percentages which relate to composition are by weight, unless otherwise indicated. In these examples, rubber adhesion is tested according to ASTM-D-429, Method B, modified to 45°. Adhesion values are reported in pounds per linear inch. Mode of failure reported conventionally as R, CM, CP, or the like, with a numerical value indicating percent. Boiling water resistance is tested by immersing test samples in boiling water for 2 hours. Failure is determined by peeling rubber from metal with pliers immediately after removal from water. This test is more severe than standard tests in which the sample is cooled to ambient temperature before peeling. When the adhesive being tested is employed with a primer (2-coat adhesive systems), the metal parts are coated with a primer, allowed to dry, coated with adhesive and again allowed to dry before being bonded to the elastomer stock. Otherwise, the unprimed metal stock parts are coated with adhesive and allowed to dry before being bonded to the elastomer stock. The pre-heat tolerance test is effected by maintaining the adhesively-coated part at vulcanization temperatures, prior to contacting the adhesive with the rubber composition being bonded, for a period of time corresponding to actual commercial practice. Standard adhesion tests are then made on the adhesively-bonded assemblies.

EXAMPLE I

A first reaction zone is charged with 133 g distilled water, 10.8 g sodium dodecyldiphenyl ether disulfonate anionic surfactant, 2.44 g ethoxylated octylphenol anionic surfactant and purged with nitrogen. A second reaction zone is charged 106 g distilled water, 1.24 g sodium dodecyldiphenyl ether disulfonate anionic surfactant, 0.27 g ethoxylated octylphenol anionic surfactant, 0.9 g ammonium persulfate, 0.9 g sodium metabisulfite and purged with nitrogen. To the first reaction zone there is added a charge of 257.5 g 2,3-dichloro-1,3-butadiene, 13.5 g vinyl benzyl chloride and 10 g acrylic acid. The contents of the first reaction zone are cooled to below 40° C. and stirred vigorously to form a monomer pre-emulsion. The second reaction zone and its contents are heated to a temperature of 40°–45° C. The monomer pre-emulsion from the first reaction zone is added to the contents of the second reaction zone at a constant rate over the course of one hour while maintaining the temperature at 40°–45° C. After completing the addition of the monomer pre-emulsion, the reaction mixture is heated for an additional 60 minutes at 40°–45° C. There is recovered a terpolymer latex which has a 95:5:3 2,3-dichloro-1,3-butadiene:vinyl benzyl chloride:acrylic acid composition. The pH of the latex is adjusted to 6.8 with dibasic lead phosphate. The latex has a total solids content (TSC) of 45%.

EXAMPLE II

Following the procedure of Example I, a terpolymer latex having an 85:15:3 2,3-dichloro-1,3-butadiene:vinyl benzyl chloride:acrylic acid composition is prepared, employing 257.5 g 2,3-dichloro-1,3-butadiene, 45.4 g vinyl benzyl chloride and 9.1 g acrylic acid. The pH of the latex is adjusted to 6.8 with dibasic lead phosphate. The latex has a total solids content of 47%.

EXAMPLE III

A first reaction zone is charged with 288 g distilled water, 27 g sodium dodecyldiphenyl ether disulfonate anionic surfactant, 15 g ethoxylated octylphenol anionic surfactant, 0.9 g sodium bicarbonate and 1.8 g sodium metabisulfite, and purged with nitrogen. To the reaction zone is added a charge of 515 g 2,3-dichloro-1,3-butadiene and 16 g vinyl benzyl chloride. The contents of the reaction zone are cooled to below 40° C. and vigorously stirred to form a monomer pre-emulsion. A second reaction zone is charged with 72 g distilled water and 1.8 g ammonium persulfate, purged with nitrogen, and its contents heated to a temperature of 40°-45° C. The monomer pre-emulsion from the first reaction zone is added to the contents of the second reaction zone at a constant rate over the course of 90 minutes, while maintaining the temperature a 40°-45° C. After completing the addition of pre-emulsion, the reaction mixture is heated for an additional 60 minutes at 40°-45° C. The resulting copolymer latex has a 95:5 2,3-dichloro-1,3-butadiene:vinyl benzyl chloride composition. The pH of the latex is adjusted to 6.8 with dibasic lead phosphate. The latex has a total solids content of 43%.

EXAMPLE IV

Adhesive compositions are prepared in a conventional manner according to the following formulations (amounts in parts by weight):

| Adhesive Ingredients | IV-A | IV-B | IV-C | IV-D | IV-E | IV-F |
|---|---|---|---|---|---|---|
| Terpolymer latex, Ex. I | 100 | — | 100 | — | 100 | — |
| Copolymer latex, Ex. III | 0 | 100 | — | 100 | — | 100 |
| p-Dinitrosobenzene | 0 | 0 | 20 | 20 | 50 | 50 |
| Water, in amount to provide Total Solids Content (TSC) of | 48 | 43 | 48 | 43 | 42 | 39 |

The adhesive compositions are employed to bond solvent-wiped, grit-blasted, cold-rolled steel to sulfur-vulcanizable natural rubber and poly(styrene-butadiene) rubber compositions. The metal parts are not primed prior to application of the adhesive. The natural rubber assemblies are cured at 153° C. for 25 minutes and tested for peel adhesion according to ASTM D-420, Method B, modified to 45° C., and for boiling water resistance. The synthetic rubber assemblies are cured at 153° C. for 30 minutes, and tested for peel adhesion following the same ASTM procedure. The results are reported in the following table:

| | Natural Rubber: | | |
|---|---|---|---|
| Adhesive | Peel Adhesion, Lb/In. | Failure Mode | Boiling Water Resistance, Failure |
| IV-A | 22 | 3R, 97 CM | a |
| IV-B | PBH | 100 CM | a |
| IV-C | 37 | 100 TR | a |
| IV-D | 26 | 10SR, 90 CM | a |
| IV-E | 39 | 100 TR | a |
| IV-F | 40 | 100 TR | a |

| | Pay (Styrene-Butadiene) Rubber: | |
|---|---|---|
| Adhesive | Peel Adhesion, Lb/In. | Failure Mode |
| IV-A | 23 | 100 CM |
| IV-B | PBH | 100 CM |
| IV-C | 158 | 87R, 13 CM |
| IV-D | 28 | 100 CM |
| IV-E | 159 | 100 R |
| IV-f | 66 | 20SR, 80 CM | a = in all cases, parts in 10 minutes, 100 CM.

EXAMPLE V

Adhesive compositions are prepared in a conventional manner according to the following formulations (amounts in parts by weight):

| Adhesive Ingredients | V-A | V-B | V-C |
|---|---|---|---|
| Terpolymer latex, Example I | 100 | 100 | 100 |
| p-Dinitrosobenzene | 33.3 | 33.3 | 33.3 |
| H$_2$O, in amount to provide % TSC of | 43 | 40 | 35 |

The adhesive compositions are employed to bond unprimed, solvent-wiped, grit-blasted, cold-rolled steel to sulfur-vulcanizable poly(styrene-butadiene) rubber compositions. The assemblies are cured at 153° C. for 30 minutes at pre-bake times of 0, 5, 10 and 15 minutes, and tested for peel adhesion in accordance with the test procedure of Example IV. The results are reported in the following table:

| Adhesive | Pre-Bake, Min. | Peel Adhesion, Lb/In. | Failure Mode |
|---|---|---|---|
| V-A | 0 | 141 | 86R, 14CM |
| V-B | 0 | 144 | 90R, 10CM |
| V-C | 0 | 105 | 40SR, 60RC |
| V-A | 5 | 107 | 40R, 60RC/CM |
| V-B | 5 | 93 | 40R, 60RC/CM |
| V-C | 5 | 78 | 8R, 92RC |
| V-A | 10 | 124 | 40R, 60RC/CM |
| V-B | 10 | 93 | 7R, 93RC/CM |
| V-C | 10 | 63 | 3R, 97RC/CM |
| V-A | 15 | 91 | 18R, 82RC/CM |
| V-B | 15 | 75 | 8R, 92RC/CM |
| V-C | 15 | 40 | 1R, 99RC/CM |

EXAMPLE VI

Adhesive compositions are prepared in a conventional manner according to the following formulations (amounts in parts by weight):

| Adhesive | VI-A | VI-B |
|---|---|---|
| Terpolymer latex, Example I | 100 | 100 |
| p-Dinitrosobenzene | 50 | 50 |
| Chlorinated terphenyl | 0 | 25 |
| Water, in amount to provide % TSC of | 50 | 50 |

The adhesive compositions are employed to bond galvanized strip steel to sulfur-vulcanizable natural rubber stock. The adhesive-coated strip steel is pre-baked at 177° C. for one minute prior to applying the rubber composition. The natural rubber assemblies are cured at 204° C. for one minute and tested according to the following procedure: The test sample is bent in half lengthwise and squeezed together with pliers. The rubber in the flex area is cut into with a razor blade and the test sample is bent back to its original position. The rubber is then peeled back on both sides with pliers. The results are reported in the following table:

| Adhesive | Failure Mode | |
|---|---|---|
| | Sides | Flex Area |
| VI-A | 100R | 100R |
| VI-B | 100R | 100R |

EXAMPLE VII

Adhesive compositions are prepared in a conventional manner according to the following formulations (amounts in parts by weight):

| Adhesive | VII-A | VII-B | VII-C |
|---|---|---|---|
| Terpolymer latex, Example II | 100 | 100 | 100 |
| p-Dinitrosobenzene | 0 | 20 | 50 |
| Water, in amount to provide % TSC of | 48 | 46.5 | 45.1 |

The adhesive compositions are employed to bond galvanized strip steel to sulfur-vulcanizable natural rubber stock, following the procedure of Example VI. The bonded assemblies are tested following the procedure of Example VI, with the following results:

| Adhesive | Failure Mode | |
|---|---|---|
| | Sides | Flex Area |
| VII-A | 93R | 100R |
| VII-B | 97R | 100R |
| VII-C | 98R | 100R |

EXAMPLE VIII

Adhesive compositions are prepared in a conventional manner according to the following formulations (amounts in parts by weight):

| Adhesive | VIII-A | VIII-B | VIII-C |
|---|---|---|---|
| Terpolymer latex; Example I | 100 | 100 | 100 |
| p-Dinitrosobenzene | 0 | 20 | 50 |
| Water, in amount to provide % TSC of | 48 | 44.8 | 41.9 |

The initial viscosity of the adhesives is measured and the adhesives are placed in an oven maintained at 54° C. The viscosity is measured after 4 and 6 weeks storage at 54° C., with the following results:

| | Storage Stability at 54° C. | | |
|---|---|---|---|
| Adhesive | VIII-A | VIII-B | VIII-C |
| Viscosity: | | | |
| Initial | 20 cps | 22 cps | 18 cps |
| Four Weeks | 20 cps | 25 cps | 18 cps |
| Six Weeks | 20 cps | 24 cps | 16 cps |

After aging for 4 weeks at 54° C., the adhesives are employed to bond galvanized strip steel to vulcanizable natural rubber stock, following the procedure of Example VI. The bond assemblies are tested following the procedure of Example VI, with the following results:

| Adhesive | Failure Mode | |
|---|---|---|
| | Sides | Flex Area |
| VIII-A | 100R | 100R |
| VIII-B | 100R | 100R |
| VIII-C | 100R | 100R |

EXAMPLE IX

An adhesive is prepared according to the following formulation (amounts are parts by weight):

| Terpolymer latex, Example I | 100 |
|---|---|
| p-Dinitrosobenzene | 33.3 |
| Carbon black | 25 |
| Water, in amount to provide % TSC of | 45.2 |

The adhesive is alternately frozen and thawed through three cycles. No visible change in physical appearance is seen.

EXAMPLE X

Following the procedure of Examples I and II, terpolymer latexes are prepared from 2,3-dichloro-1,3-butadiene, vinyl benzyl chloride and various third monomers at a 2,3-dichloro-1,3-butadiene:vinyl benzyl chloride:third monomer ratio of 95:5:3. Adhesives are prepared by adjusting the pH of the latexes to 6–7 with ammonium hydroxide and adding 35 parts by weight, per 100 parts by weight (dry) of terpolymer, of p-dinitrosobenzene. With each adhesive, five coats are applied on phosphatized steel to build a fim thickness of 0.6 mils. The adhesive-coated steel parts are bonded to sulfur-vulcanizable natural and styrene-butadiene rubbers, employing a vulcanization cycle of 25 minutes at 153° C. The bonded assemblies are tested for peel adhesion and boiling water resistance following the procedure of Example IV, with the following results:

| Third Monomer | Peel Adhesion, Lb/In. | Failure Mode | Boiling Water Resistance, Failure |
|---|---|---|---|
| None | 11 | 2R, 98CM | 2R, 98CM |
| Acrylic Acid | 162 | 75R, 25CM | 20R, 80CM |
| Methacrylic acid | 82 | 30R, 70CM | 20R, 80CM |
| 2-Hydroxyethyl acrylate | 21 | 2R, 98CM | 2R, 98CM |
| 2-Hydroxymethyl methacrylate monophosphate | 150 | 95R, 5CM | 28R, 72CM |
| Vinyl pyrrolidone | 38 | 8R, 92CM | 100CM |
| N—methylol acrylamide | 59 | 8R, 92CM | 100CM |
| Butyl acrylate | 94 | 10R, 90CM | 100CM |
| Itaconic acid | 167 | 95R, 5CM | 8R, 92CM |
| Acrylamide | 113 | 35R, 65CM | 100CM |

EXAMPLE XI

Following the procedure of Examples I and II, terpolymer latexes are prepared from 2,3-dichloro-1,3-butadiene, vinyl benzyl chloride and various third monomers at a 2,3-dichloro-1,3-butadiene:vinyl benzyl chloride:third monomer ratio of 100:4.2:y, where y is the mole percent of third monomer. Adhesives are prepared by adjusting the pH of the latexes to 6–7 with ammonium hydroxide and adding 34 parts by weight, per 100 parts by dry weight of terpolymer, of p-dinitrosobenzene. Phosphatized steel coupons are dipped into the adhesives to build a dry film thickness of 0.6 mils. The adhesive-coated steel parts are bonded to sulfur-vulcanizable natural and styrene-butadiene rubbers, employing a vulcanization cycle of 25 minutes at 153° C. The bonded assemblies are tested for peel adhesion and boiling water resistance following the procedure of Example IV, with the following results:

| Effect of Level of Acidic Third Monomer on Adhesion | | | | |
|---|---|---|---|---|
| Third Monomer | Y, Mole %, Third Monomer | Peel Adhesive, Lb/In. | Failure Mode | Boiling Water Resistance, Failure |
| Acrylic acid | 2.6 | 178 | 96R, 4CM | 4R, 96CM |
| Acrylic acid | 5.0 | 134 | 85R, 15CM | 20R, 80CM |
| Acrylic acid | 9.6 | 159 | 98R, 2CM | 58R, 42CM |
| Methacrylic acid | 2.6 | 114 | 48R, 52CM | 2R, 98CM |
| Methacrylic acid | 5.0 | 105 | 48R, 52CM | 10R, 90CM |
| Methacrylic acid | 9.6 | 138 | 60R, 40CM | 10R, 90CM |
| 2-Hydroxyethyl methacrylate monophosphate | 2.6 | 114 | 96R, 4CM | 60R, 40CM |
| 2-Hydroxyethyl methacrylate monophosphate | 5.0 | 106 | 46R, 54CM | 2R, 98CM |

EXAMPLE XII

An adhesive is prepared according to the following formulation (amounts are in parts by weight, dry basis):

| | |
|---|---|
| Terpolymer, Example I | 100 |
| p-Dinitrosobenzene | 33.3 |
| Carbon black | 33.3 |
| water, in an amount to provide TSC % | 43.0 |

The adhesive is employed to bond solvent-wiped, grit-blasted cold-rolled steel to sulfur-vulcanizable natural rubber stock. Prior to application of the adhesive, the steel parts are coated with a heat-reactive phenolic resin commercial rubber-metal primer composition. The assemblies are cured at 153° C. for 30 minutes. The cured assemblies are tested for boiling water resistance, corrosion resistance (salt spray environment) and heat resistance (assembly is heated to 121° C. and tested for adhesion), with the following results:

| | Environmental Resistance | |
|---|---|---|
| Test | Peel Adhesion, Lb/In. | Failure |
| Boiling Water, 2 Hrs. | | 100R |
| Salt spray, 48 Hrs. | | 99R, 1CM |
| Adhesion at 121° C. | 41 | 97R, 3CM |

EXAMPLE XIII

The adhesive composition of Example XII is employed to bond vulcanizable natural, styrene-butadiene, neoprene and butyl rubber stocks to solvent-wiped, grit-blasted, cold-rolled steel parts which have been coated with a commercial heat-reactive phenolic resin rubber-metal primer, with the following results:

| | Test | Peel Adhesion | |
|---|---|---|---|
| Elastomer | Conditions | Lb/In. | Failure |
| Natural rubber | No pre-bake | 47 | 100R |
| Natural rubber | 10 minute pre-bake | 31 | 2R, 98RC |
| Natural rubber | 15 minute pre-bake | 34 | 2R, 98RC |
| Natural rubber | No pre-bake, cure at 121° C. for 1 hr. | 37 | 100R |
| Natural rubber | No pre-bake, cure at 153° C. for 1 hr. | 53 | 100R |
| Natural rubber | Salt spray, 48 hrs. | | 90R, 10CM |
| Natural rubber | Boiling water, 2 hrs. | | 100R |
| Natural rubber | No pre-bake, cure at 153° C. for 5 min. | 41 | 100R |
| Styrene-butadiene rubber | No pre-bake | 157 SB | 100R |
| | 10 minute pre-bake | 59 | 100R |
| | Conical test, ASTM D429-C | 740 Lb. SB | 100R |
| Neoprene rubber | No pre-bake | 127 | 100R |
| | 10 minute pre-bake | 106 | 100R |
| Butyl rubber | No pre-bake | 94 | 100R |
| | 5 minute pre-bake | 26 | 100R |

In addition, adhesive-coated assemblies are stored for 12 weeks prior to bonding. These assemblies are bonded to vulcanizable natural rubber stock and exhibit a failure mode of 82R, 18RC (edge).

I claim:

1. A terpolymer latex adhesive composition comprising
   (A) on a dry weight basis, 100 parts by weight of latex consisting essentially of at least one emulsion-polymerized terpolymer of
      (i) from 60 to 97 percent by weight, based on total weight of said terpolymer, of at least one 2,3-dihalo-1,3-butadiene conjugated diene monomer, wherein the halogen substituent is selected from the group consisting of chlorine, bromine or iodine;
      (ii) from 2 to 23 percent by weight, based on total weight of said terpolymer, of at least one olefinically unsaturated first monomer which is at least copolymerizable with the conjugated diene monomer and which is selected from the group consisting of at least one monoalkenyl aromatic alkyl halide compound having the formula

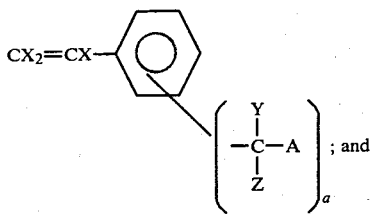

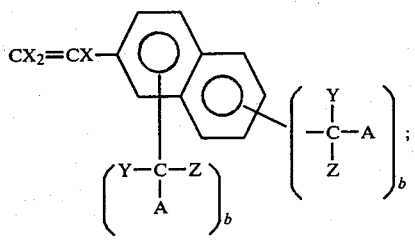

wherein X is hydrogen, chlorine, bromine or iodine; Y is hydrogen, chlorine or bromine; Z is hydrogen, chlorine or bromine and A is hydrogen, chlorine, bromine or an alkyl group having from one to three carbon atoms, with the proviso that at least one of Y, Z or A is chlorine or bromine and, when A is alkyl, at least one of Y or Z is chlorine or bromine; a is one or two; and b is zero, one to two, with the proviso that at least one b be at least one; and (iii) from 0.5 to 10 percent by weight, based on total weight of said terpolymer, of at least one olefinically unsaturated second monomer which is at least copolymerizable with the conjugated diene monomer and which is selected from the group consisting of olefinically unsaturated monomers which have at least one

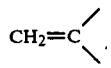

group and at least one —COOH group, with the provisos that the olefinically unsaturated second monomer, (a), be polymerizable by unsaturation addition, and, (b), when the second monomer contains more than one

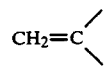

group, such groups are conjugated or cross-conjugated;

(B) at least one surfactant agent selected from the group consisting of anionic surfactant agents and a mixture of at least one anionic surfactant agent and at least one nonionic surfactant agent, the amount of said surfactant agent being in the range from 0.1 to 15 parts by weight, per 100 parts by weight of said conjugated diene total weight of said conjugated diene monomer, said olefinically unsaturated first monomer and said olefinically unsaturated second monomer and wherein, in said mixture of anionic and nonionic surfactant agents, the amount of anionic surfactant agent is in the range from 1.2 to 2.1 parts by weight per part by weight of said nonionic surfactant agent; and, (C) water in an amount to provide an adhesive latex composition having a total solids content in the range from 5 to 60 percent.

2. An adhesive composition according to claim 1 having dispersed therein from 1 to 200 parts by weight of at least one aromatic nitroso compounds.

3. An adhesive composition according to claim 1 wherein said olefinically unsaturated second monomer is selected from the group consisting of acrylic acid, methacrylic acid and 2-hydroxyethyl methacrylate monophosphate.

4. An adhesive composition according to claim 1 wherein said monoalkenyl aromatic alkyl halide comprises vinyl benzyl chloride.

5. An adhesive composition according to claim 3 wherein said monoalkenyl aromatic alkyl halide comprises vinyl benzyl chloride.

6. An adhesive composition according to claim 2 wherein said olefinically unsaturated second monomer is selected from the group consisting of acrylic acid, methacrylic acid, and 2-hydroxyethyl methacrylate monophosphate.

7. An adhesive composition according to claim 2 wherein said monoalkenyl aromatic alkyl halide comprises vinyl benzyl chloride.

8. An adhesive composition according to claim 7 wherein said olefinically unsaturated monomer is selected from the group consisting of acrylic acid, methacrylic acid, and 2-hydroxyethyl methacrylate monophosphate.

9. An adhesive composition according to claim 1 wherein said 2,3-dihalo-1,3-butadiene comprises 2,3-dichloro-1,3-butadiene.

10. An adhesive composition according to claim 3 wherein said 2,3-dihalo-1,3-butadiene comprises 2,3-dichloro-1,3-butadiene.

11. An adhesive composition according to claim 4 wherein said 2,3-dihalo-1,3-butadiene comprises 2,3-dichloro-1,3-butadiene.

12. An adhesive composition according to claim 5 wherein said 2,3-dihalo-1,3-butadiene comprises 2,3-dichloro-1,3-butadiene.

13. An adhesive composition according to claim 2 wherein said 2,3-dihalo-1,3-butadiene comprises 2,3-dichloro-1,3-butadiene.

14. An adhesive composition according to claim 6 wherein said 2,3-dihalo-1,3-butadiene comprises 2,3-dichloro-1,3-butadiene.

15. An adhesive composition according to claim 7 wherein said 2,3-dihalo-1,3-butadiene comprises 2,3-dichloro-1,3-butadiene.

16. An adhesive composition according to claim 15 wherein said olefinically unsaturated second monomer is selected from the group consisting of acrylic acid, methacrylic acid and 2-hydroxyethyl methacrylate monophosphate.

17. An adhesive composition according to claim 16 wherein said olefinically unsaturated second monomer comprises acrylic acid.

* * * * *